INVENTOR.
ANTONIO TAVERA
BY
Kimmel & Crowell
ATTORNEYS.

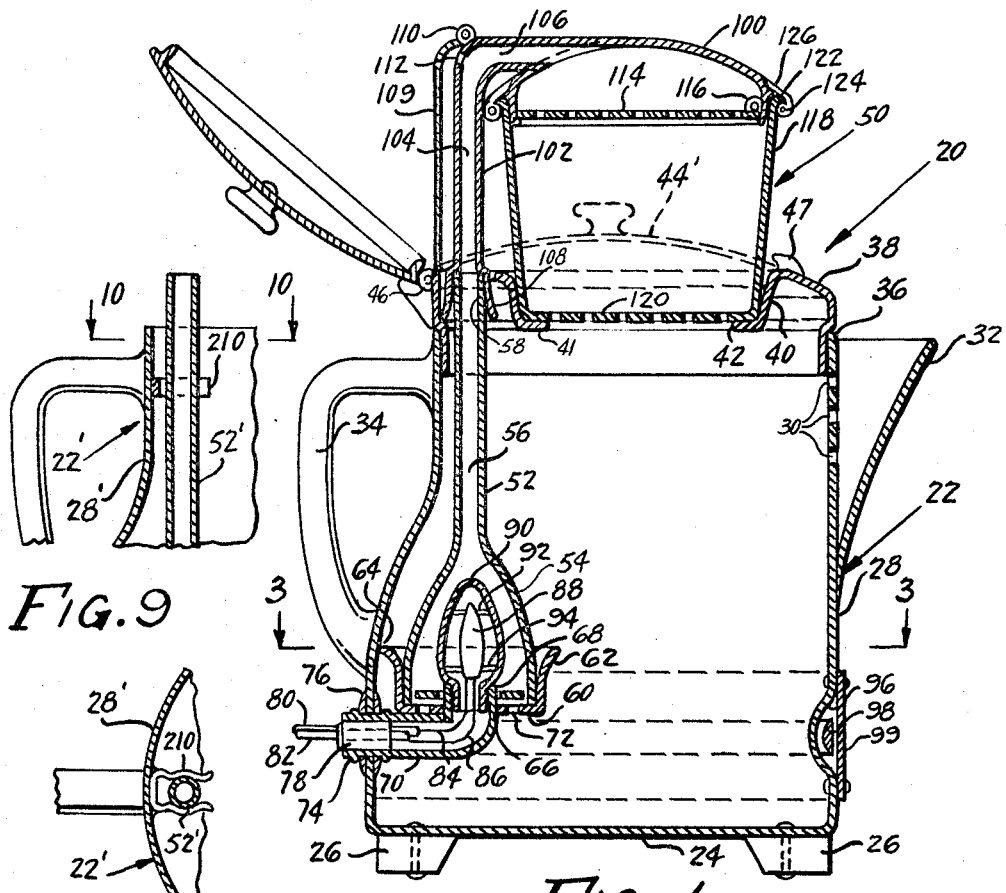
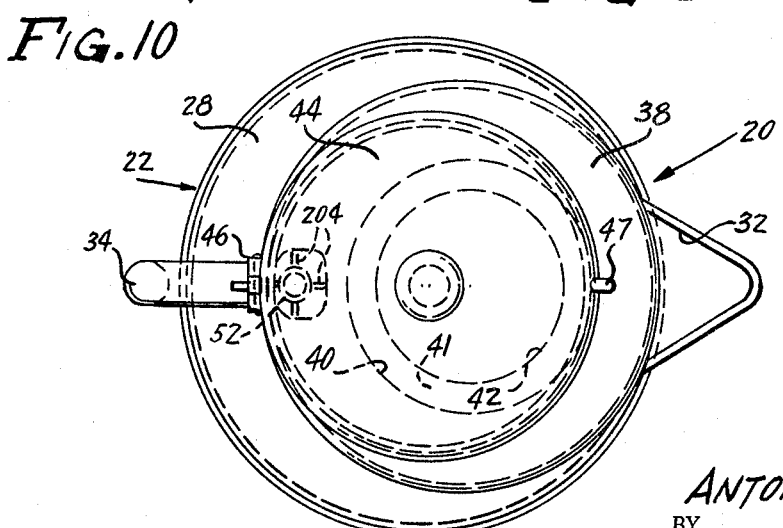

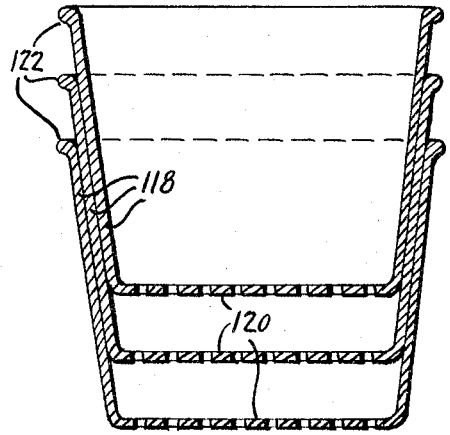
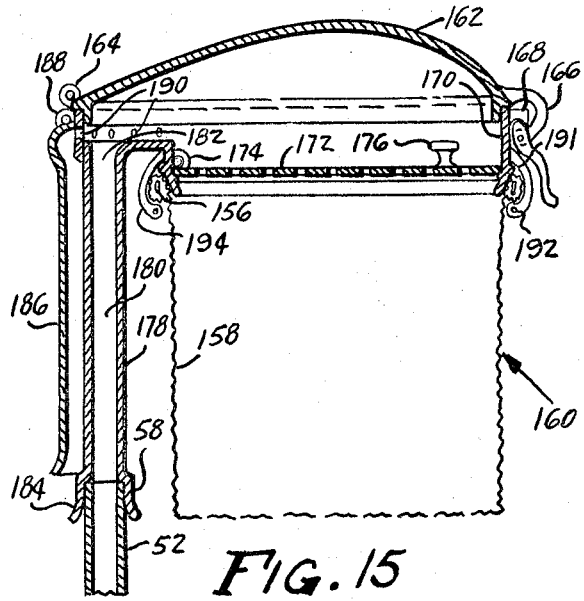
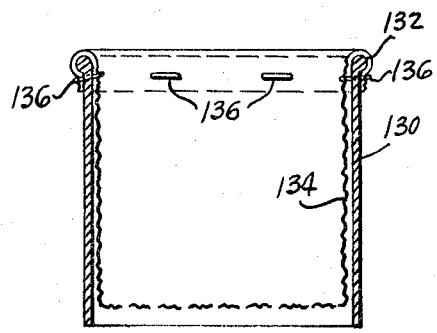
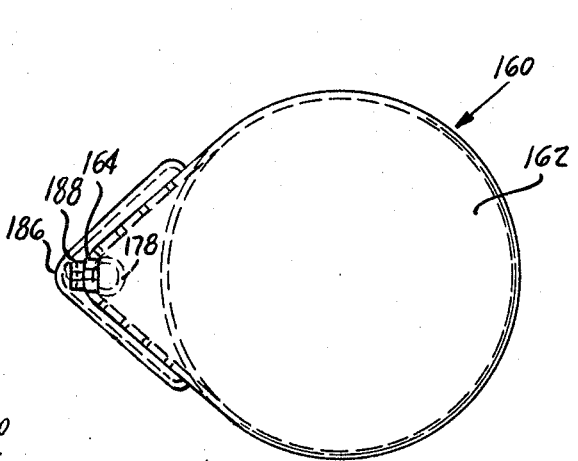
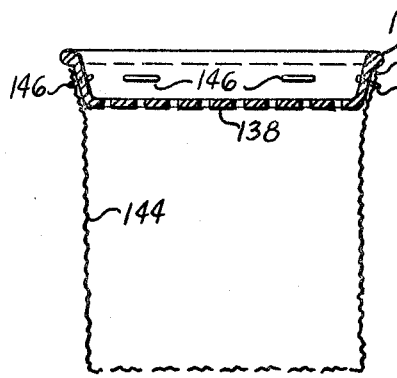
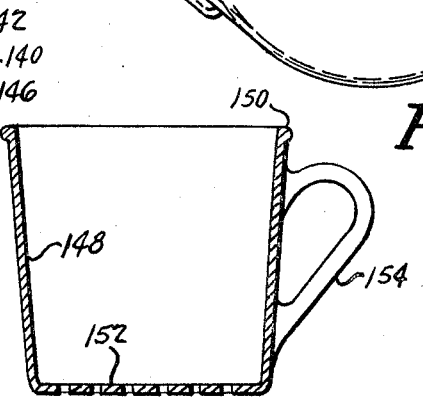

United States Patent Office 3,270,659
Patented Sept. 6, 1966

3,270,659
PREPACKED COFFEE CONTAINING CARTRIDGE
Antonio Tavera, Rte. 1, Box 1386, Elk Grove, Calif.
Filed May 20, 1964, Ser. No. 368,888
19 Claims. (Cl. 99—295)

This invention relates to a coffee percolator and more particularly to an electrically operated coffee percolator having a prepacked coffee containing cartridge cooperating therewith, and also to reusable and disposable cartridges to be filled by the user, cooperating with the percolator.

A primary object of this invention is the provision of a coffee percolator which prepares a more palatable product in a more efficient and expeditious manner.

Another object of this invention is the provision of an electric coffee percolator having a first heating coil which actually percolates the coffee and a second heating coil to keep the coffee warm after the percolating operation has been completed.

A further object of the instant invention is the provision of such a device wherein the heating elements are spaced from the bottom of the percolator part to preclude roasting or cooking of the sediment which normally settles thereon.

A still further object of the instant invention is the provision of an electrical coffee percolator with a heating coil which is accessible for maintenance or replacement.

Yet another object of this invention is to provide a coffee percolator which will complete the percolating action in less than half the time required by devices used heretofore.

A further object of this invention is the provision of a coffee percolator carrying a prepacked coffee containing cartridge which is readily disposable.

A still further object of the instant invention is to provide a device of the type described with a reusable coffee containing cartridge.

Yet another object of this invention is to provide a coffee percolator with various embodiments of prepacked coffee containing cartridges which are readily affixed to, and removed from, the percolator to facilitate use of the device.

A further object of this invention is the provision of a coffee percolator which is sturdy and durable in construction, reliable and efficient in operation, and relatively simple and inexpensive to manufacture, assemble, utilize, and maintain.

Other and further objects reside in the combinations of elements, arrangements of parts, and features of construction.

Still other objects will in part be obvious and in part be pointed out as the description of the invention proceeds and as shown in the accompanying drawings wherein:

FIGURE 1 is a vertical cross-sectional view through a coffee percolator and coffee containing cartridge in accordance with the instant inventive concept, a cover being shown in full lines in its open position and in dotted lines in its closed position;

FIGURE 2 is a top plan view of the percolator with a cover in a closed position and the cartridge removed therefrom;

FIGURE 9 is a fragmentary sectional view through a modified construction for securing the percolator stem means within the percolator pot;

FIGURE 10 is a fragmentary cross-sectional view taken substantially on line 10—10 of FIGURE 9;

FIGURE 11 is a vertical cross-sectional view through a plurality of disposable cups in nested relation;

FIGURE 12 is a vertical cross-sectional view through a modified form of means for supporting a quantity of coffee for the cartridge of the instant invention;

FIGURE 13 is a vertical cross-sectional view through still another modified coffee containing means;

FIGURE 14 is a vertical cross-sectional view through a reusable cup for use with the cartridge of the instant invention;

FIGURE 15 is a vertical sectional view through another form of cartridge for use with the percolator of FIGURE 1, showing a still further modification of means for supporting a quantity of coffee associated therewith; and FIGURE 16 is a top plan view of the cartridge of FIGURE 15.

Similar reference characters refer to similar parts throughout the several views of the drawings.

Figure 4:
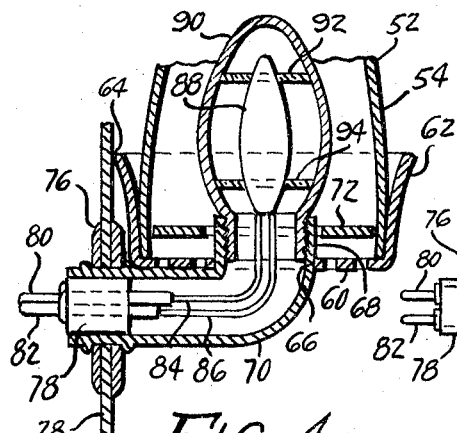
FIGURE 4 is an enlarged fragmentary sectional view through the heating coil and accompanying parts at the bottom of the percolator stem means.
Figure 3:
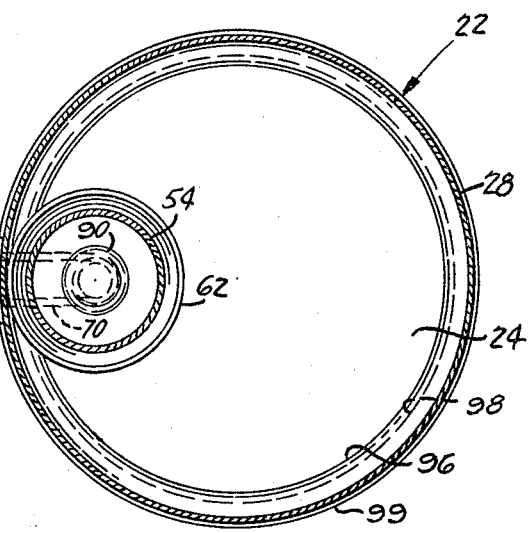
FIGURE 3 is a transverse cross-sectional view taken substantially on line 3—3 of FIGURE 1.
Figure 6:
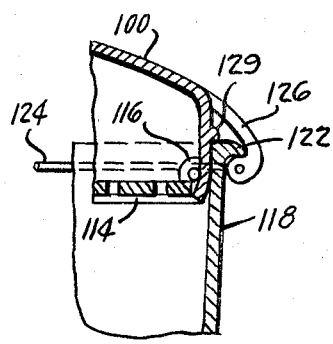
FIGURE 6 is an enlarged fragmentary cross-sectional view taken substantially on line 6—6 of FIGURE 5.
Figure 5:
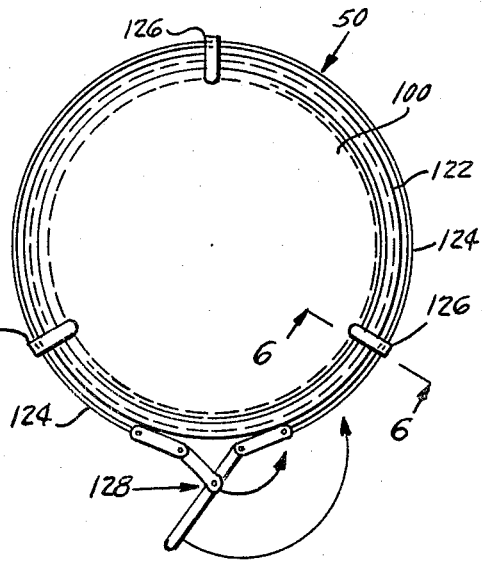
FIGURE 5 is a top plan view of the cartridge itself showing the means for securing a coffee containing cup therein.

Referring now to the drawings in general and more particularly to FIGURES 1 to 6, a device in accordance with the instant inventive concept is designated generally by the reference numeral 20 and comprises a percolator 22 including a closed bottom 24 supported on feet 26, an upstanding side wall 28 having perforations 30 communicating with a pouring spout 32 and carrying a handle 34 and having an open top 36 receiving thereon a lid 38 with a central recess 40 including an inwardly directed rim 41 on which the cartridge 50 rests and having portions defining an opening 42, a cover 44 being pivotally secured to 46 to the lid 38 and being movable from a first position shown in full lines in FIGURE 1 remote from the opening 42 when a cartridge 50 is received on the lid 38 in a manner, and for a purpose to be described in more detail hereinafter, and a second position shown in dotted lines at 44' in FIGURE 1 wherein it overlies and closes the opening 42 when the cartridge 50 is removed, a flexible latch member 47 securing the cover 44 in its second position.

A tubular percolator stem means 52 has a flared lower end 54 and defines a longitudinal bore 56 having an open upper end 58. A perforated plate 60 includes an upwardly and outwardly flared peripheral flange 62 guidingly receiving the flared lower end 54 of the percolator stem means 52 and is secured to the interior of the side 28 of the percolator 22 at 64. The plate 60 includes an enlarged central opening 66 through which first portions 68 of a tubular element 70 passes in fluid tight relationship. A washer member 72 is slidingly received over the first portion 68 of the tubular element 70 between a first position where it rests on the plate 60 and seals the perforations therein, and a second position where it is spaced above the plate as will be explained in more detail hereinafter. Second portions 74 of the tubular element 70 extend through a fluid tight grommet 76 in the side 28 of the percolator 22 and carry a male connecting means 78 having prongs 80, 82 to be secured in any conventional manner to a female connecting means (not shown) conductively associated with a source of electrical energy. A pair of conductors 84, 86 extend from the prongs 80, 82 to a heating coil 88 supported within an expanded bulbous member 90 by insulating washers 92, 94 within the flared lower end 54 of the percolator stem means 52. The bulbous member 90 is removably carried by the first portions 68 of the tubular element 70 in any conventional watertight manner, such as by the external threads on the bulbous member shown in the drawing or by internal threads received over first portion 68 of the tubular element 70 (not shown) or by a press fit relationship (not shown). Any necessary insulating means may be included to protect the bulbous member 90 from excessive heat from the heating coil 88.

This portion of the device may be constructed by first securing the flange 62 to the percolator side 28 at 64 by welding or other conventional means after which first portions 68 of the tubular element 70 is inserted through the opening 66 in the plate 60 and secured thereto. The washer member 72 is then dropped over the first portion 68 of the tubular element 70 and the heating coil 88 is then assembled with the bulbous member 90 in any desired manner. The bulbous member 90 may be removed after the percolator stem means 52 has been lifted from the plate 60 to replace or service the heating coil 88.

The side 28 of the percolator 22 has a concave portion 96 adjacent its lower end in which an additional heating element 98 is disposed in circumscribing relationship. An insulating band 99 surrounds the heating element 98 and is secured to the side 28 and to the second portions 74 of the tubular element 70 in any conventional manner. The heating element 98 can be insulated as necessary to keep side 28 from overheating. A thermostat (not shown) is placed in the conductive means connected to the heating coil 88 or in close proximity thereto. The thermostat is regulated in any conventional manner to automatically cut off the heating coil 88 when the percolating action has been completed. A hot wire (not shown) bypasses the thermostat and is connected to the additional heating element 98 to energize this element at all times unless the main source of electrical power is disconnected thereby keeping the coffee at a proper temperature. As will be seen from the drawings, both the heating coil 88 and the additional heating element 98 are spaced from the bottom 24 of the percolator 22 to preclude burning or continually heating any sediment thereon.

The cartridge 50 includes a receptacle having an imperforate dome-shaped top 100 which carries means for supporting a quantity of coffee, this means having at least one opening 42 in communication with the opening 42 in the lid 38 as will be explained in more detail hereinafter. A tubular cartridge stem means 102 defines a longitudinal bore 104 therewithin and is carried in offset relationship by the dome-shaped top 100 with an open upper end 106 of the bore in communication with the receptacle above the quantity of coffee and an open lower end flared at 108 to seat on the open upper end 58 of the percolator stem means 52 whereby the longitudinal bores in both stem means are in communication. A breather means 109 in the form of an arcuate element seating against the side of the cartridge stem means 102 is pivotally secured at 110 to allow for swinging this element upwardly for cleaning the same. A vent 112 is defined by the breather means 109 in communication with the interior of the receptacle above the quantity of coffee, the lower end of the breather means 109 being open to the atmosphere. In this embodiment the cartridge 50 further includes a perforated upper plate 114 hingedly secured at 116 to the dome-shaped top 100 to allow success to the space thereabove for cleaning purposes.

One embodiment of the means for supporting a quantity of coffee includes a substantially rigid cup-shaped member 118 having a perforated bottom 120 restingly received on the rim 41 in the recess 40 in overlying relationship to the opening 42, the side walls of the cup-shaped member 118 flaring outwardly and upwardly as shown particularly in FIGURE 11 to permit a plurality of these members to be nestingly engaged. A plurality of these cups can be sold in nested relationship in a disposable carton in a manner similar to the well known paper cups. An upper peripheral bead 122 defines a substantially rigid ring which is engaged by a flexible element 124 in the form of a wire or the like carried by a plurality of resilient fingers 126 secured to the dome-shaped top 100, the flexible element 124 normally having a larger diameter than the peripheral bead 122 with snap over center means 128 shown in FIGURE 5 being provided to decrease the diameter of the flexible element 124 to cause the same to underlie the bead 122 and thereby removably carry the cup-shaped member 118. A rim 129 is secured to the dome-shaped top 100 to limit the upward movement of the bead 122 andt hereby correctly position the same. After the percolating action has been completed, the cup-shaped member 118 may be readily removed by loosening the snap over center means 128 to be replaced by a new prepacked cup-shaped member when a new pot of coffee is to be made.

FIGURES 12 to 15 show modified means for supporting a quantity of coffee. In the embodiment of FIGURE 12 a substantially cylindrical element 130 has an upper peripheral bead 132 defining the ring to be carried by the flexible element 124, a collapsible and permeable cup-shaped member 134 which may be formed of cloth, filter paper, wire mesh or any other conventional material being secured as by staples 136 to the cylindrical element 130.

FIGURE 13 shows an embodiment having a perforated plate 138 with an upwardly extending peripheral flange 140 terminating in a peripheral bead 142 defining the ring to be supported by the flexible element 124, a collapsible and permeable cup-shaped member 144 similar to the member 134 of the embodiment of FIGURE 12 being secured by staples or the like 146 to the peripheral flange 140. With this embodiment, a perforated plate, such as 114, is not necessary since it carries its own perforated plate 138.

The embodiment of FIGURE 14 is substantially the same as the embodiment of FIGURE 11 wherein a cup-shaped member 148 has outwardly and upwardly flaring sides terminating in a peripheral bead 150 with a lower perforated plate 152, this embodiment including a handle 153 secured to the side of the cup-shaped member 148 to render the device more readily reusable.

The means for supporting a quantity of coffee in the embodiment of FIGURE 15 includes a substantially rigid ring 156 having secured directly thereto in any conventional manner a collapsible and permeable cup-shaped member 158, the ring 156 being carried by the flexible element 124 of the embodiment of FIGURE 1 or by a flexible element in the modified construction of the cartridge 160 shown in FIGURE 15. The cup-shaped member 158 is collapsible and may have tight weave sides or may be of a boilable type collapsible plastic with a perforated filter bottom to be filled by the user and disposed of or to be sold as a prepacked disposable unit. This modified cartridge 160 includes an imperforate dome-shaped top 162 pivotally carried at 164 and secured by a latch 166 to a lug 168 on an annular member 170. An upper perforated plate 172 is pivotally secured at 174 to the annular member 170 with a knob 176 being provided to facilitate lifting the same. In this embodiment the cartridge stem means 178 has a longitudinal bore 180 communicating at its upper end 182 with the dome-shaped top 162 above the quantity of coffee and a lower annular flange 184 of same seats on the open upper end 58 of the percolator stem means 52. The breather means 186 is pivotally secured at 188 and is widened at its top to allow a plurality of spaced vents 190 to be defined therein whereby the percolating action will be under the influence of gravity rather than pressure as with the embodiment of FIG. 1 wherein the vent 112 is dimensioned to cause a buildup of back pressure. Of course, the vent in this embodiment may also be so dimensioned in the preferred use of the instant inventive concept. With this embodiment the collapsible and permeable cup-shaped member 158 is secured against a rim 191 by a flexible element 192 carried by resilient fingers 194 in a manner similar to that shown in FIGURE 5. After the cup-shaped member 158 has been secured in position, and with the dome-shaped top 162 and the perforated plate 176 pivoted counterclockwise as seen in FIGURE 15 about their respective pivot means 164, 174, respectively, the coffee is placed in the cup-shaped member. The perforated plate 172 and the dome-shaped top 162 are then dropped to their operating position as shown in FIGURE 15 and the coffee brewed. After the percolating action the cup-shaped member 158 may be readily removed and replaced for a later pot of coffee.

Figure 7:
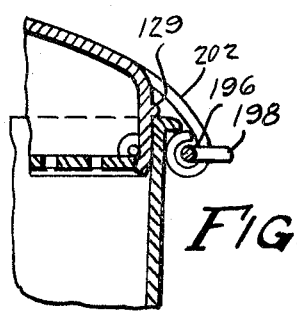
FIGURE 7 is a view similar to FIGURE 6 showing a modified form of cup securing means.
Figure 8:
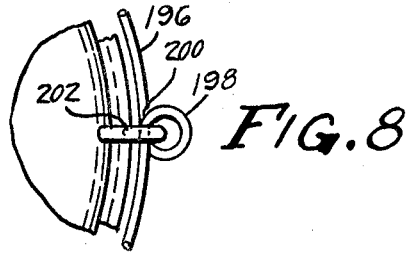
FIGURE 8 is a fragmentary top plan view of the modification of FIGURE 7.

A modified embodiment of the flexible element is shown in FIGURES 7 and 8 at 196 as including loops 198 engaged with loops 200 on the resilient fingers 202.

The tubular stem means 52 may be secured by spacers 204 to the lid 38 for removal therewith. In the embodiment of FIGURES 9 and 10 a flexible clip 210 is carried by the interior of the side 28' of the percolator 22' to removably grasp the upper end of the percolator stem means 52'.

The use and operation of the device of the instant invention will now be apparent. The cover 44 is pivoted to its first position shown in full lines in FIGURE 1 and a predetermined quantity of water is inserted into the percolator 22. A cartridge is seated on the lid 38 with the lower flared end of its cartridge stem means carried by the upper open end of the percolator stem means 52 and with the lower portion of whichever means is used for supporting a quantity of coffee seating on the recess 40 over the opening 42 in the lid 38. If the embodiment of FIGURE 15 is utilized the dome-shaped top 162 and the perforated plate 172 are pivoted to allow filling of whichever cup-shaped member is carried by the flexible element 192. The heating coil 88 is energized from a remote source of electrical energy and water enters the perforations in the plate 60 seeping around the washer member 72 and passing upwardly through the percolator stem means 52 and the cartridge stem means 102 to be released above the quantity of coffee. With the use of the small vent, before the water has had a chance to escape through the coffee grounds since it enters faster than it can seep out, a pressure is built up which chokes off or closes the vent to the breather means thereby creating a back pressure which momentarily forces the washer member 72 downwardly to seal the perforations in the plate 60. Since the heating coil 88 is still continuing to heat the water during the above-described operation, a counter pressure is built up. This counter pressure becomes great enough to overcome the pressure brought up at the top of the cartridge and with great force, and almost instantaneously this counter pressure forces the water completely through the coffee grounds. Immediately theerafter, air again enters through the vent in the breather means and the cycle is repeated. In essence, this creates a super fast percolating action which will perk a pot of coffee in less than half the time required by previously known methods. With the FIG. 15 embodiment, if a plurality of vents are utilized, the percolating action will function under the influence of gravity rather than under pressure.

On completion of the percolating action the heating coil 88 is cut out by the thermostat and the additional heating element 98 continues to maintain the coffee warm. The cartridge can then be readily removed and the cover 44 moved to its second position to allow pouring of the coffee as desired. The means supporting the quantity of coffee can be quickly and easily replaced as explained hereinabove when a new pot of coffee is to be made.

It will now be seen that there is herein provided an improved coffee percolator which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative, and not in a limiting sense.

It is to be understood that a general reference to the cartridge in the appended claims is to be considered as directed to any of the embodiments hereinbefore described, each of which may be reusable or disposable, and each of which may be prepacked or filled by the user.

I claim:

1. In combination, a percolator including a bottom, an upstanding side and an open top, a lid closing said open top of said percolator, said lid having an opening therein, a tubular percolator stem means having a flared lower end and including portions defining a longitudinal bore having an open upper end, a plate underlying said flared lower end of said percolator stem means, said plate having at least one perforation therein, a heating coil disposed within said flared lower end of said percolator stem means, and a washer member overlying said plate and movable between a first position wherein it rests on said plate and seals said perforations therein and a second position wherein it is spaced above said plate, a cartridge including a receptacle having an imperforate dome-shaped top, means carried by said dome-shaped top for supporting a quantity of coffee therewithin, said last-mentioned means including portions defining at least one opening in communication with said opening in said lid of said percolator, a tubular cartridge stem means including portions defining a longitudinal bore having an open upper end communicating with said receptacle above said quantity of coffee and an open lower end aligned with, and in communication with, said open upper end of said bore in said percolator stem means, and breather means including portions defining a vent communicating with the interior of said receptacle above said quantity of coffee.

2. The structure of claim 1 further including an additional heating element circumscribing said side of said percolator adjacent said bottom of the same, and an insulating band covering said additional heating element.

3. The structure of claim 2 wherein said heating coil and said additional heating element are spaced above said bottom of said percolator.

4. The structure of claim 1 wherein said plate has an upwardly and outwardly flared peripheral flange, said flared lower end of said percolator stem means seating on said plate within said peripheral flange in removable relationship.

5. The structure of claim 1 wherein said plate includes an enlarged central opening, a tubular element including first portions passing through said enlarged central opening in fluid tight relationship, said washer member being slidingly received over said first portions of said tubular element.

6. The structure of claim 5 wherein said tubular element includes second portions extending through said side of said percolator in fluid tight relationship, conductor means for said heating coil passing through said tubular element, and a bulbous member carried by said first portions of said tubular element in watertight, overlying relationship to said heating coil.

7. The structure of claim 6 wherein said bulbous member is removably secured to said first portions of said tubular element.

8. The structure of claim 1 wherein the upper end of said percolator stem means is fixedly secured to said lid.

9. The structure of claim 1 wherein the upper end of said percolator stem means is removably carried by the interior of said side of said percolator.

10. The structure of claim 1 wherein said means for supporting a quantity of coffee is removably secured to said dome-shaped top of said receptacle.

11. The structure of claim 10 wherein said means for supporting a quantity of coffee includes a substantially rigid upper peripheral ring, a plurality of peripherally spaced resilient fingers secured to said dome-shaped top of said receptacle, a flexible element carried by each of said fingers, said flexible element normally having a larger diameter than said ring, and means for decreasing the diameter of said flexible element to cause the same to underlie said ring and thereby carry said means for supporting a quantity of coffee.

12. The structure of claim 11 wherein said means for supporting a quantity of coffee includes a rigid cup-shaped member having a perforated bottom, an outwardly and upwardly flared side and an upper peripheral bead defining said ring.

13. The structure of claim 12 further including a handle secured exteriorly of said side of said cup-shaped member.

14. The structure of claim 11 wherein said means for supporting a quantity of coffee includes a substantially cylindrical element having an upper peripheral bead defining said ring and a collapsible and permeable cup-shaped member having an upper peripheral edge secured to said cylindrical element.

15. The structure of claim 11 wherein said means for supporting a quantity of coffee includes a perforated plate having an upwardly extending peripheral flange terminating in a peripheral bead defining said ring and a collapsible and permeable cup-shaped member having an upper peripheral edge secured to said peripheral flange.

16. The structure of claim 11 wherein said means for supporting a quantity of coffee further includes a collapsible and permeable cup-shaped member having an upper peripheral edge secured to said ring.

17. The structure of claim 1 wherein said percolator stem means is offset to one portion of the side of said percolator, a central recess defined in said lid, a peripheral rim formed by said recess and defining said opening, and said means for supporting a quantity of coffee resting on said rim.

18. The structure of claim 17 further including a cover pivotally secured to said lid and movable between a first position remote from said opening in said lid when said means for supporting a quantity of coffee is resting in said recess, and a second position overlying and closing said opening when said cartridge is removed.

19. The structure of claim 1 wherein said cartridge includes a perforated upper plate beneath said dome-shaped top and overlying said means for supporting a quantity of coffee, said means for supporting a quantity of coffee having an open upper end, and said dome-shaped top and said perforated plate each being pivotally supported whereby they may be moved between a first position overlying said open upper end of said means for supporting a quantity of coffee and a second position spaced from said open upper end of said means for supporting a quantity of coffee, said means for supporting a quantity of coffee being filled with said dome-shaped top and said perforated plate in said second position.

References Cited by the Examiner
UNITED STATES PATENTS

| | | | |
|---|---|---|---|
| 866,985 | 9/1907 | Trewhella | 99—311 |
| 1,995,081 | 3/1935 | Sommers | 99—312 X |
| 2,175,727 | 10/1939 | Graham | 99—310 X |
| 2,233,256 | 2/1941 | Gonzalez | 99—313 |
| 2,268,633 | 1/1942 | Aske | 99—315 X |
| 3,081,709 | 3/1963 | Dombrowik | 99—310 X |

IRVING BUNEVICH, *Primary Examiner.*

S. P. FISHER, *Assistant Examiner.*